(12) United States Patent
Ataman

(10) Patent No.: US 9,784,600 B2
(45) Date of Patent: Oct. 10, 2017

(54) PROXIMITY SENSOR FOR AIRCRAFT, PROVIDED WITH A SPECIAL SEALED ASSEMBLY

(71) Applicant: MESSIER-BUGATTI-DOWTY, Velizy Villacoublay (FR)

(72) Inventor: Gary Ataman, Whitby (CA)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 0 days.

(21) Appl. No.: 14/849,893

(22) Filed: Sep. 10, 2015

(65) Prior Publication Data

US 2016/0084681 A1 Mar. 24, 2016

(30) Foreign Application Priority Data

Sep. 22, 2014 (FR) ...................................... 14 58926

(51) Int. Cl.
| | |
|---|---|
| *G01D 11/24* | (2006.01) |
| *G01D 11/30* | (2006.01) |
| *B64C 25/00* | (2006.01) |
| *G01D 5/12* | (2006.01) |

(52) U.S. Cl.
CPC ............ *G01D 11/24* (2013.01); *B64C 25/001* (2013.01); *G01D 5/12* (2013.01); *G01D 11/245* (2013.01); *G01D 11/30* (2013.01)

(58) Field of Classification Search
None
See application file for complete search history.

(56) References Cited

U.S. PATENT DOCUMENTS

2007/0139041 A1   6/2007   Steinich

FOREIGN PATENT DOCUMENTS

| DE | 10 2005 060 676 A1 | 6/2007 |
|---|---|---|
| DE | 10 2007 037 759 A1 | 2/2009 |
| EP | 1 901 040 A2 | 3/2008 |
| WO | 2007/012072 A1 | 1/2007 |

OTHER PUBLICATIONS

French Search Report of French Patent Application No. 14 58926, dated May 28, 2015.

*Primary Examiner* — Andre Allen
(74) *Attorney, Agent, or Firm* — Sughrue Mion, PLLC

(57) ABSTRACT

A sensor (1) comprising a casing (2) delimiting an internal volume (3) and having a passage (31) between the internal volume and a first external zone (Z1) external to the casing; a moving part (4) moveable inside the internal volume (3); detector (5) for detecting a movement of the moving part (4) comprising a detection portion (51) extending in the passage (31) and having a groove (52) open to the outside of the detection portion (51), the groove (52) extending between the first external zone (Z1) external to the casing and the internal volume (3) internal to the casing. The sensor (1) comprises first sealing structure (14) positioned around the detection portion (51) inside the passage (31), the first sealing structure (14) being arranged in such a way as to prevent fluid from passing between the internal volume (3) and the first external zone (Z1) via the groove (52).

14 Claims, 4 Drawing Sheets

PROXIMITY SENSOR FOR AIRCRAFT, PROVIDED WITH A SPECIAL SEALED ASSEMBLY

The invention relates to a sensor and in particular to a system comprising an actuating cylinder and a sensor that can be used for detecting a position of a piston of the actuating cylinder.

BACKGROUND OF THE INVENTION

More particularly, the invention relates to a sensor comprising:
- a casing delimiting an internal volume internal to the casing and having a passage extending between this internal volume and a first external zone external to the casing;
- a moving part able to move inside the said internal volume of the casing;
- detection means for detecting a movement of the said moving part with respect to the casing, these detection means comprising a detection portion extending in the passage, between the said first external zone external to the casing and the said internal volume internal to the casing, this detection portion also having a groove open to the outside of the detection portion, this groove extending between the said first external zone external to the casing and the said internal volume internal to the casing.

That portion of the detection means which is positioned in the passage of the casing has a groove open to the outside. This groove, formed on the detection means, allows angular positioning of the detection portion with respect to the casing.

Such a sensor may malfunction in cold conditions, because, cold/Ice may prevent the moving part from sliding in the internal volume.

OBJECT OF THE INVENTION

The object of the invention is to obtain a sensor capable of limiting the risk of malfunction when subjected to low temperatures.

SUMMARY OF THE INVENTION

In order to achieve this objective, the invention proposes a sensor of the type already defined and essentially characterized in that it comprises first sealing means positioned around the detection portion and placed inside the passage, these first sealing means being arranged in such a way as to prevent fluid from passing between the internal volume and the first external zone external to the casing via said groove.

As the sealing means prevent the passage of fluid via the groove, the risk of any moisture entering the internal volume is limited and as a result the risk of ice jamming the moving part in this internal volume is limited.

By virtue of the invention, it is possible to use detection means that have a groove for orienting the portion of the detection means with respect to the casing while at the same time limiting the risk of moisture passing along the groove.

The invention is of particular benefit in fields such as that of aeronautical engineering in which the sensors have to be standardized and certified before they can be used. By virtue of the invention, while providing an additional function of sealing between detection means and casing, detection means that have already been standardized and having an orientation groove for orienting the detection means with respect to the casing can be employed. This then avoids the need to develop new detection means without grooves, which development would involve beginning a burdensome standardization process.

The sensor according to the invention is particularly suited to being incorporated into an aircraft landing gear to detect a position of a piston of an actuating cylinder of the landing gear. Specifically, as it moves along, the aircraft experiences significant variations in pressure, temperature and moisture levels and this has a tendency to encourage ice to form in any spaces that contain water or water vapour. By limiting the passage of fluid, along the groove, towards the internal volume of the sensor, the risks of low temperature malfunctioning caused by the jamming of the moving part are limited.

With preference, the first sealing means are designed to guarantee sealing against the passage of fluids as long as the differential pressure between the internal volume and the first external zone does not exceed 300 kPa.

The 300 kPa value corresponds to twice the value of 150 kPa which is the maximum pressure differential existing between an atmosphere pressure measured at 0 m of altitude and an atmospheric pressure measured at 12 000 m of altitude.

In one particular embodiment of the sensor according to the invention, at least one portion of the length of the groove is filled with a sealant arranged to oppose the said passage of fluid between the internal volume and the first external zone external to the casing via the said groove.

In one embodiment of the invention which is combined with the preceding one, the first sealing means comprise an annular ring assembled in a sealed manner inside the passage to form a guide sleeve guiding the translational movement of the detection portion inside the passage and with respect to the casing. The detection portion is assembled in a sealed manner inside the ring, and the ring assembled inside the passage and the detection portion assembled inside the ring form a sealed assembly that opposes the passage of fluid between the internal volume and the first external zone.

This embodiment makes it possible to have an interface between the detection portion that penetrates the passage of the casing and the internal surface of the casing. This interface is of benefit for example in preventing the sealant present in the groove from coming into contact with a surface of the casing while the detection means are being assembled or dismantled.

The risk of damaging the sealant present in the groove is thus limited.

In combination with the previous embodiment of the sensor according to the invention, the first sealing means comprise an annular seal, such as an O-ring seal, positioned around the ring in such a way as to oppose the passage of fluid, around the outside of the ring, between the internal volume and the first external zone.

The use of such an annular seal makes maintenance operations on the sensor easier by allowing the ring to be fitted to and removed from the passage.

The detection means can thus be assembled or dismantled with respect to the casing while keeping them inside the ring which protects them.

Ideally, the annular seal is an O-ring seal fitted into an annular groove formed all around the passage and opening into this passage of the casing.

In one particular embodiment of the sensor according to the invention, the detection means comprise electronic components such as a transistor and/or an amplifier and/or an inductor which are liable to become damaged in the event of prolonged contact with ice or water. To protect them, these electronic components are placed in a sealed space situated inside that portion of the detection means which is placed inside the passage of the casing.

In one particular embodiment of the invention, the sensor according to the invention further comprises:
actuating means passing through a second opening formed in the casing, these actuating means being arranged in such a way as to control the movement of the said moving part situated inside the said internal volume from a second external zone external to the casing;
second sealing means arranged with respect to the casing and with respect to the actuating means in such a way as to oppose the passage of fluid from the second external zone towards the said internal volume, via the said second opening of the casing.

The invention also relates to a system comprising a sensor according to the foregoing embodiment of the invention, this system further comprising a hydraulic actuating cylinder comprising a piston and a hydraulic chamber in which this piston slides, the said second external zone external to the casing and a portion of the actuating means being situated inside the hydraulic chamber of the actuating cylinder so that a movement of the piston in the hydraulic chamber can control the movement of the actuating means and cause the moving part to move inside the internal volume of the casing of the sensor.

In this embodiment, the detection means that detects the movement of the moving part are in communication with the internal volume internal to the casing of the sensor in order to detect the movement of this moving part.

The internal volume internal to the casing and the hydraulic chamber are hydraulically isolated from one another by the second sealing means which prevent the detection means from being subjected to the high hydraulic pressures applied in the chamber of the actuating cylinder.

The actuating means which extend in part into the chamber of the hydraulic actuating cylinder allow the movement of the moving part in the casing to be controlled on the basis of the position of the piston in the hydraulic actuating cylinder.

Thus the sensor according to the invention can be used to determine the position of a piston in a chamber of a hydraulic actuating cylinder without the detection means being exposed to the high pressures of the hydraulic chamber.

BRIEF DESCRIPTION OF THE DRAWING

Other features and advantages of the invention will become clearly apparent from the description given hereinafter by way of entirely nonlimiting indication with reference to the attached drawings in which:

FIG. 5b is a side view of the detection means and of the mounting plate which are illustrated in FIG. 5a;

DETAILED DESCRIPTION OF THE INVENTION

Figure 1:
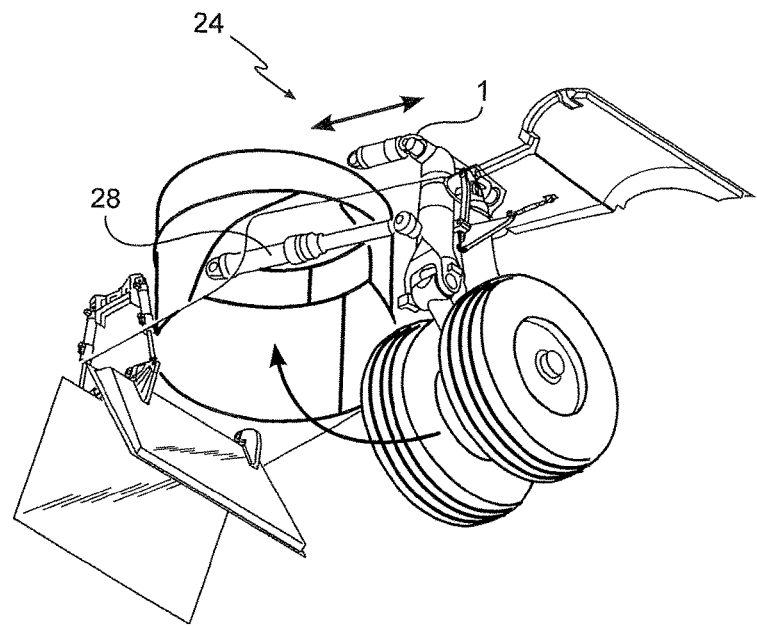
FIG. 1 is a perspective view of an aircraft landing gear comprising a hydraulic actuating cylinder for extending and retracting the landing gear, this actuating cylinder being equipped with a sensor according to the invention in order to be able to detect a position of movement of a piston in a hydraulic chamber of the actuating cylinder.

As indicated previously, the invention relates to a sensor 1 enabling the detection of a position of sliding of a piston 22 of a hydraulic actuating cylinder 21.

More specifically, the invention relates to a system 24 such as an aircraft landing gear equipped with a hydraulic actuating cylinder 21 for extending and/or retracting the aircraft landing gear with respect to the aircraft airframe. As may be seen in the longitudinal section that is FIG. 2, this actuating cylinder 21 has a piston 22 and a hydraulic chamber 23 in which this piston 22 slides.

The sensor 1 is assembled in a manner that is sealed against the body of the actuating cylinder 21 so as to detect at least a position of sliding of the piston 22 inside the body of the actuating cylinder 21.

This sensor 1 according to the invention comprises:
a casing 2 delimiting an internal volume 3 internal to the casing and having a passage 31 extending between this internal volume 3 and a first external zone Z1 external to the casing 2;
a moving part 4, formed for example of a metal core, situated inside the said internal volume 3 of the casing in order to be able to slide therein;
detection means 5 for detecting a movement of the said moving part 4 with respect to the casing 2, these detection means 5 comprising a detection portion 51 extending in the passage 31, between the first external zone Z1 and the internal volume 3. This detection portion 51 has a lateral groove 52 open to the outside of the detection portion 51 and extending between the first external zone Z1 and the internal volume 3 internal to the casing.

Figure 2:
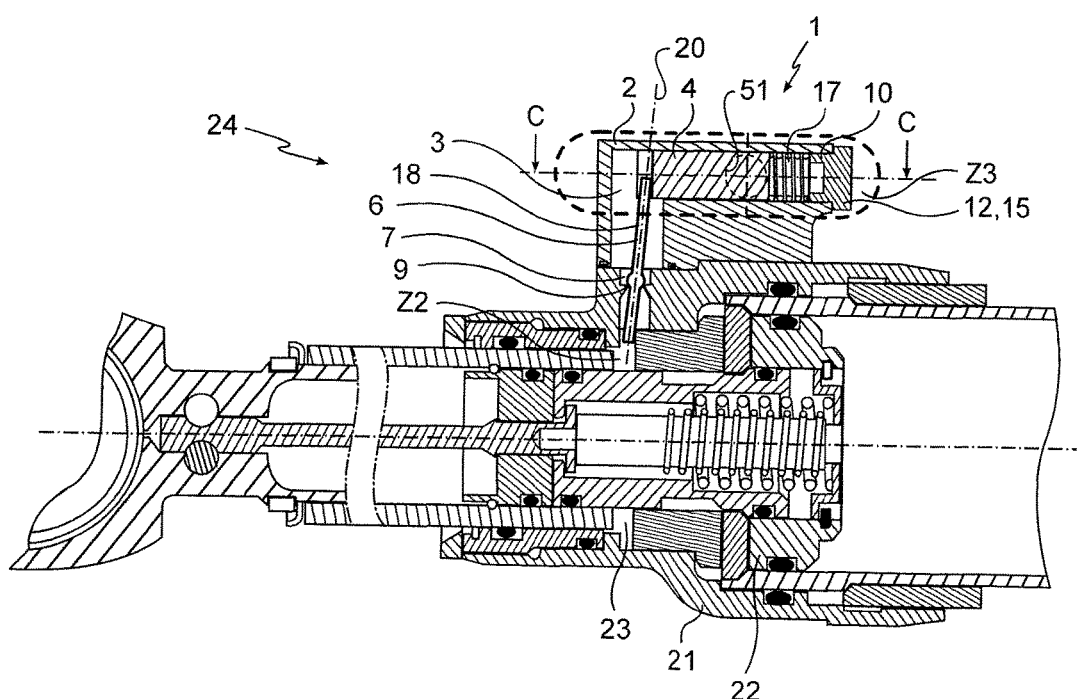
FIG. 2 is a view in longitudinal section of a portion of the hydraulic actuating cylinder and of the sensor which are used in the landing gear illustrated in FIG. 1, this sensor making it possible to detect at least a position of sliding of the piston inside the actuating cylinder.
Figure 3A:
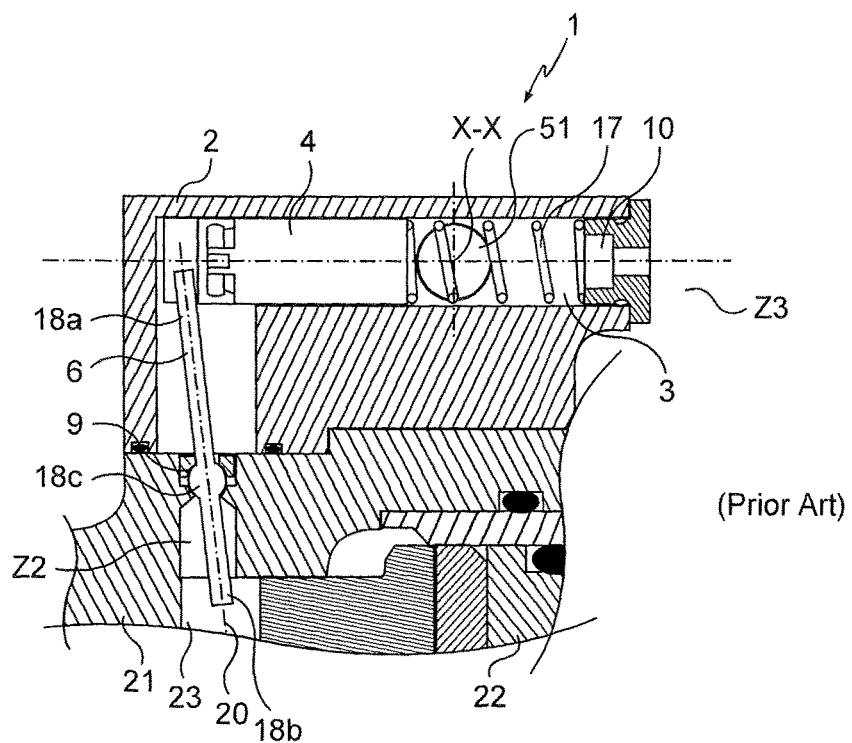
FIG. 3a is a view in longitudinal section of a sensor of the prior art having an internal volume in which a moving part slides, this internal volume internal to the casing is open and not sealed allowing water to migrate from outside the sensor into the internal volume.
Figure 3B:
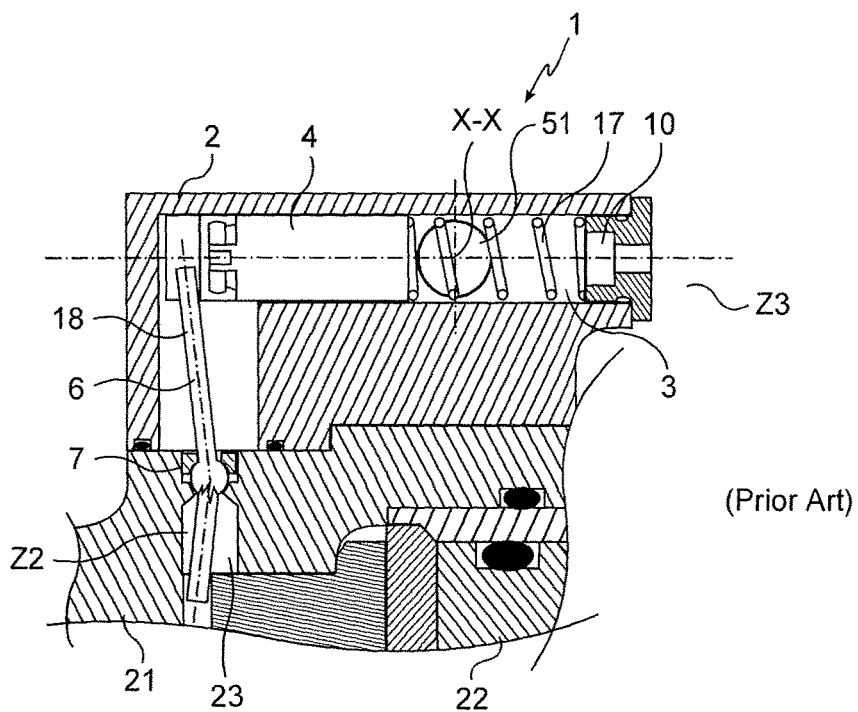
FIG. 3b is a view in section of the sensor of the prior art illustrated in FIG. 3a, showing the breakage of an actuating lever that actuates the moving part, this breakage being the result of the fact that the moving part is jammed with ice present in the casing while the lever, immobilized by the ice, is forced by the piston of the hydraulic actuating cylinder.
Figure 4:
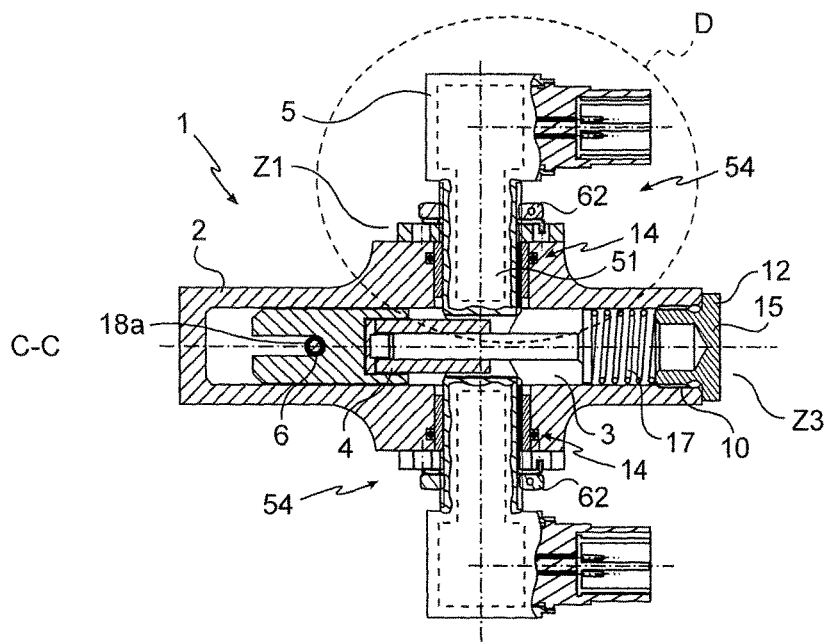
FIG. 4 is a view in section on a plane C-C of the sensor according to the invention shown in FIG. 2.
Figure 5A:
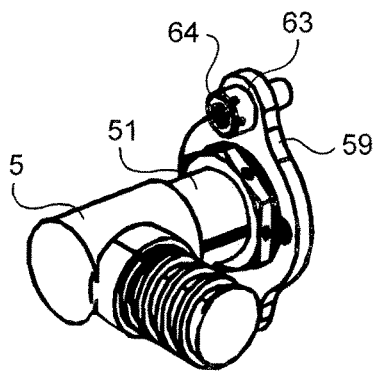
FIG. 5a is a perspective view of the detection means of the sensor according to the invention while they are assembled on a mounting plate, these detection means and the mounting plate are identical to those visible in FIG. 4.
Figure 5B:
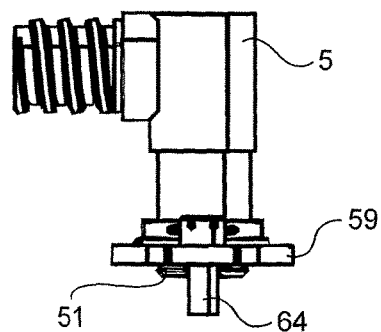
Figure 5C:
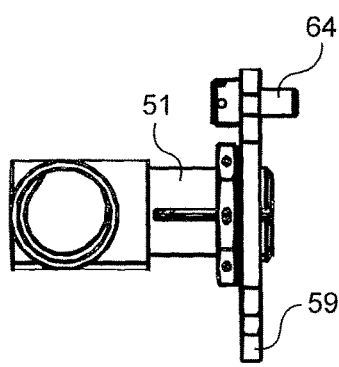
FIG. 5c is a face-on view of the detection means and of the mounting plate which are illustrated in FIGS. 5a and 5b.
Figure 5D:
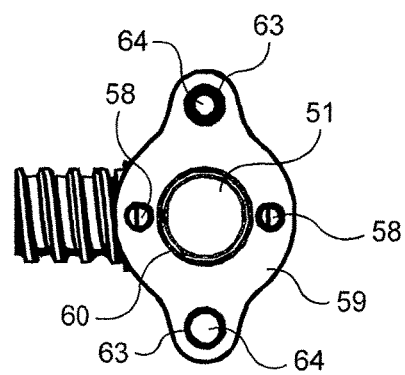
FIG. 5d is a view from underneath of the detection means and of the mounting plate which are illustrated in FIGS. 5a, 5b and 5c.
Figure 6:
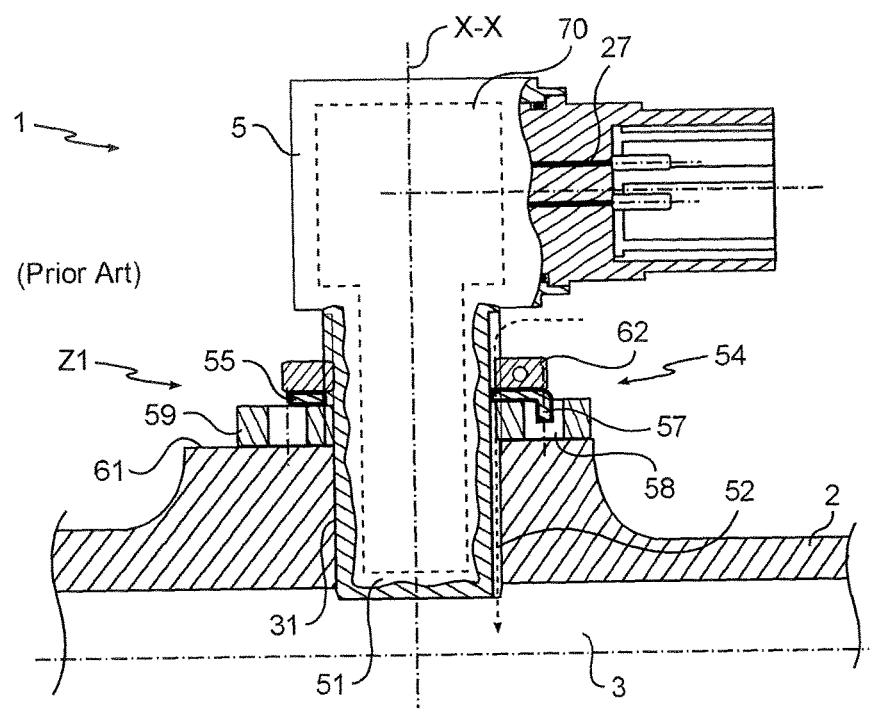
FIG. 6 is a view in part section of a sensor of the prior art showing the presence of a groove formed on the detection means, this groove extending along a passage formed in the casing in order to allow the angular orientation of these detection means relative to the casing, a disadvantage of this sensor being that it allows fluid to pass via the groove towards the internal volume.
Figure 7:
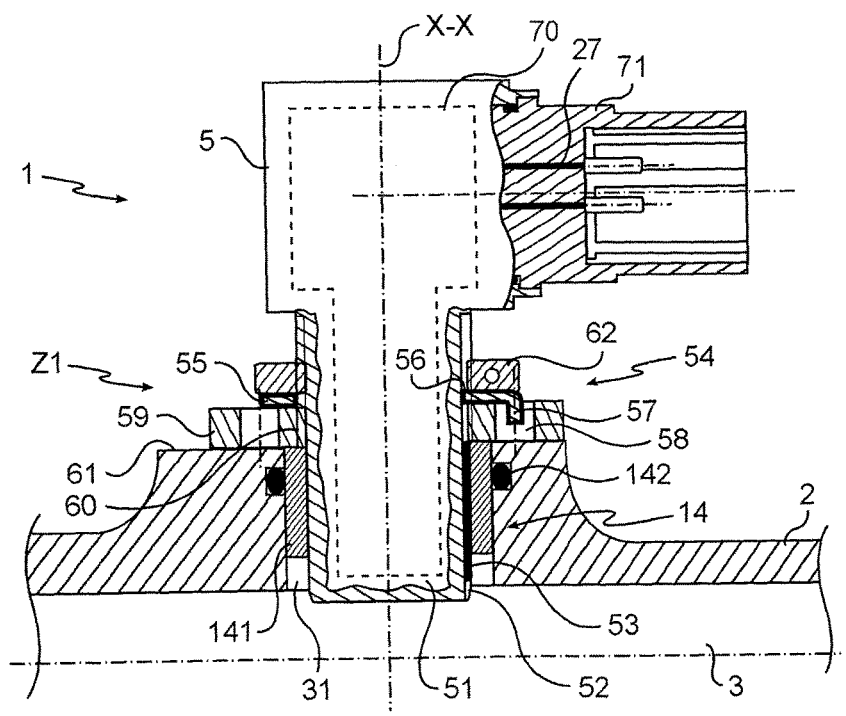
FIG. 7 is a view in part section of a sensor according to the invention having detection means identical to those of the sensor of the prior art, these detection means notably comprising a groove but in this instance the detection means are assembled with the casing in a sealed manner so as to prevent the passage of fluid between the internal volume and the outside of the sensor.

As can be seen in FIG. 2 and, in particular, in the sectioned views of FIGS. 4 and 7, the sensor 1 according to the invention comprises first sealing means 14 positioned around the detection portion 51 and placed inside the passage 31. These first sealing means 14 are arranged in such a way as to prevent fluid from passing between the internal volume 3 and the first external zone Z1 via the said groove 52.

The detection means 5 comprise electronic components placed in a sealed space 70 extending inside that portion 51 of the detection means 5 which is placed in the passage 31 of the casing. This sealed space 70 protects the electronic components from effects connected with variations in pressure in the internal volume 3 or at the first external zone Z1.

These electronic components are designed to generate a signal indicative of a relative position of sliding with the moving part 4 in the internal volume 3.

These electronic components may constitute a magnetic or capacitive sensor that detects the proximity of the part 4 with respect to the components.

This signal may be transmitted via wired means 27 which are connected to the electronic components and pass through a sealed wall 71 delimiting the sealed space 70. As can be seen in particular in FIG. 7, these wired means 27 comprise connector assemblies forming a connector accessible from outside the sensor 1 so as to be coupled to a complementary connector. This encourages interchangeability of the sensor.

The passage 31 formed trough the wall of the casing 2 is of cylindrical shape and allows that portion 51 of the detection means 5 that is likewise cylindrical to be introduced.

This detection portion 51 which is of right cylindrical shape extends around and along a longitudinal axis of symmetry X-X. A rectilinear groove 52 extends parallel to this longitudinal axis of symmetry X-X and along the cylindrical shape of the detection portion 51.

This detection portion 51 is assembled in a sealed manner inside an annular ring 141, this ring 141 itself being assembled in a sealed manner inside the passage 31. Thus, when assembled with one another, the detection portion 51, the ring 141 and the casing 2 form a sealed assembly that opposes the passage of fluid between the internal volume 3 and the first external zone Z1.

For that, the annular ring 141 is of a shape that complements the passage 31 and an O-ring seal is placed in an annular groove 142 formed in the passage 31, at the periphery of the passage. This O-ring seal 142 extends around the ring 141 in order to provide sealing all around the ring, between the ring and the casing 2. This ring and the passage are fitted to one another in such a way as to allow the ring to be inserted or extracted without damage either to the passage 31 or to the seal 142. Thus, the ring 141 forms a guide sleeve guiding the translational movement of the detection portion 51 inside the passage 31 and with respect to the casing 2.

At least a portion of the length of the groove 52 is filled with a sealant 53 designed to oppose the passage of fluid between the internal volume 3 and the first external zone Z1 via the groove 52.

This sealant 53 may be a polymer poured into the groove such as silicone or thermoplastic polymer. It will be noted that the ring and the portion 51 of the detection means may be bonded together.

Provision may also be made for an annular seal to extend inside the ring and grip the portion 51 and prevent leaks between the ring and the portion 51.

Securing means 54 are arranged on the outside of the casing 2 for assembling the detection means 5 with the casing 2.

The securing means 54 comprise a mounting plate 59 having a threaded hole 60 into which is screwed a part of the detection means 5 which is outside the casing 2. For that reason this hole 60 has a female screw thread that complements a male screw thread external to the detection means 5. A part of the groove 52 which is on the outside of the passage passes through this mounting plate 59 and extends as far as the outside of the sensor. The mounting plate 59 is secured against an external surface 61 of the casing 2 which, in this particular instance, is a planer surface.

The threaded hole 60 is of dimensions such that it opposes the passage of the ring 141 through the hole 60. Thus, the mounting plate 59 forms an axial end stop that prevents the ring from coming out of the passage 31. As can be seen in particular in FIGS. 5a, 5b, 5c and 5d, the mounting plate 59 has lateral holes 63 positioned around the threaded hole 60 to allow the passage of clamping bolts 64. These clamping bolts 64 are screwed into complementary holes made in the casing 2. These clamping bolts 64 allow the mounting plate 59 to be clamped against the casing 2.

The securing means 54 that secure the detection means 5 also have a washer 55 which is coaxial with the axis X-X and through which there passes a part of the detection means 5 which is on the outside of the casing 2. This washer 55 has central 56 and periphery 57 tabs, the central tab 56 entering the groove 52 to prevent relative rotation between the washer 55 and the detection means 5. The periphery tab 57 enters a complementary housing 58 that is fixed with respect to the casing 2 so as to prevent relative rotation between the washer 55 and the casing 2. This washer 55 is thus set out in such a way as to index in terms of rotation the detection means 5 with respect to the casing 2.

The securing means 54 also comprise a clamping nut 62 that clamps the washer 55 against the mounting plate 59. This nut 62 is screwed onto that part of the detection means 5 that is on the outside of the casing 2 and into which part of the groove 52 extends.

The housing 58 that the peripheral tab 57 of the washer 55 enters is formed through the mounting plate 59. This housing 58 is produced some distance from the threaded hole 60 into which that part of the detection means 5 that is on the outside of the casing 2 is screwed. As the washer 55 is positioned between the nut 62 and the mounting plate 59 which are screwed onto the male screw thread of the detection means 5, the detection means 5 are effectively positioned axially with respect to the casing 2. The tabs of the washer have the effect of immobilizing the detection means 5 with respect to the casing 2 in terms of rotation about the axis X-X.

The casing furthermore has second and third openings 7 and 10 extending between the volume 3 and the outside of the casing.

Actuating means 6 pass through the second opening 7 of the casing 2. These actuating means 6 are designed to control the movement of the said moving part 4 from a second external zone Z2 external to the casing 2.

Second sealing means 9 are arranged with respect to the casing 2 and with respect to the actuating means 6 so as to prevent the passage of fluid from the second external zone Z2 external to the casing 2 towards the said internal volume 3 and via the second opening 7.

The sealed assembly between the sensor 1 and the body of the actuating cylinder 21 is performed:

in such a way that the second external zone Z2 and a portion of the actuating means 6 are situated inside the hydraulic chamber 23 of the actuating cylinder 21; and in such a way that a movement of the piston 22 in the hydraulic chamber can cause the movement of the actuating means 6 and make the moving part 4 move/slide in the internal volume 3 of the casing.

To achieve that, the actuating means 6 which pass through the second opening 7 comprise a lever 18 having first and second parts 18a, 18b situated one on each side of a spherical portion 18c of the lever.

The lever first part 18a lies inside the internal volume 3 and presses against the moving part 4. The second part 18b of the lever 18 extends in the second external zone Z2 and is designed so that the piston 22 can come into contact with this second part 18b at least when this piston 22 reaches one of its end-of-travel positions inside the actuating cylinder 21.

A gland fits firmly around the spherical portion 18c of the lever to allow it to pivot relative to this gland about at least one axis of pivoting perpendicular to a main axis 20 of the lever 18. It will be noted that the lever 18 is a component extending longitudinally along this main axis 20, this lever preferably exhibiting symmetry of revolution. This gland forms part of the second sealing means 9 and provides sealing against the spherical portion 18c of the lever 18 all around this spherical portion 18c to prevent fluid from passing between the second zone Z2 and the internal volume 3.

The third opening 10 is made for inserting the moving part 4, which is of cylindrical shape, into the internal volume 3.

Third sealing means 12 comprising a threaded plug 15 are designed to prevent fluid from passing between the internal volume 3 and a third external zone Z3 external to the casing. This plug 15 is assembled by screwing into the third opening 10 of the internal volume 3.

The first, second and third sealing means 14, 9, 12 are engineered so that they can withstand a pressure differential of at least 300 kPa, this value corresponding to the difference between a pressure obtaining inside the internal volume and a pressure obtaining at the third external zone Z3 external to the casing 2.

It will be noted that this value of 300 kPa corresponds approximately to twice the pressure differential there is between an atmospheric pressure measured at 0 m of altitude and an atmospheric pressure measured at 12 000 m of altitude.

Thus, the first, second and third sealing means withstand the variations in ambient pressure to which the aircraft is subjected in flight.

As illustrated in FIG. 2, a return spring 17 applies to the moving part 4 an elastic return force returning it towards a first position of sliding in the internal volume 3. This first position here corresponds to the position that part 4 occupies when the piston 22 is in a position distant from its ends of travel. This return spring 17 is compressed between the plug 15 and the moving part 4 against each of which it presses. The spring 17 allows the lever 18 to be returned elastically to a position in which it lies when it is not in contact with the piston 22.

The system according to the invention is placed for detecting the moment at which the landing gear is fully down/deployed and at which the landing gear strut 28 needs to be locked in order to prevent unwanted return of the landing gear to its retracted position.

As illustrated in FIG. 4, the sensor according to the invention comprises two detection means 51 placed on each side of the casing to detect the position of the moving part 4 in the internal volume 3. Each of these detection means passes through a passage 31 specific to it. These passages 31 face one another. The detection means 51 positioned in this way are redundant for added security in detecting the position of movement of the part 4. It will be noted that these detection means may also be arranged in such a way as to interact with one another according to the position of the part 4 with respect to these detection means 5.

The invention claimed is:

1. A sensor (1) comprising:
a casing (2) delimiting an internal volume (3) internal to the casing and having a passage (31) extending between the internal volume and a first external zone (Z1) external to the casing;
a moving part (4) moveable inside the internal volume (3) of the casing;
a detector (5) for detecting a movement of the moving part (4) with respect to the casing (2), the detector (5) comprising a detection portion (51) extending in the passage (31), between the first external zone (Z1) external to the casing and the internal volume (3) internal to the casing, the detection portion (51) also having a groove (52) open to the outside of the detection portion (51), the groove (52) extending between the first external zone (Z1) external to the casing and the internal volume (3) internal to the casing,
wherein the sensor comprises first sealing means (14) positioned around the detection portion (51) and placed inside the passage (31), the first sealing means (14) being arranged in such a way as to prevent fluid from passing between the internal volume (3) and the first external zone (Z1) external to the casing (2) via said groove (52).

2. The sensor (1) according to claim 1, in which at least one portion of the length of the groove (52) is filled with a sealant (53) arranged to oppose the passage of fluid between the internal volume (3) and the first external zone (Z1) external to the casing via the said groove (52).

3. The sensor according to claim 2, in which the first sealing means (14) comprise an annular ring (141) assembled in a sealed manner inside the passage (31) to form a guide sleeve guiding the translational movement of the detection portion (51) inside the passage (31) and with respect to the casing (2), the detection portion (51) being assembled in a sealed manner inside the ring (141), the ring (141) assembled inside the passage (31) and the detection portion (51) assembled inside the ring (141) forming a sealed assembly that opposes the passage of fluid between the internal volume (3) and the first external zone (Z1).

4. The sensor (1) according to claim 3, in which the first sealing means (14) comprise an annular seal (142) positioned around the ring in such a way as to oppose the passage of fluid, around the outside of the ring (141), between the internal volume (3) and the first external zone (Z1).

5. The sensor according to claim 1, in which the detection portion (51) is of right cylindrical shape and extends around and along a longitudinal axis of symmetry (X-X), the groove (52) being rectilinear and extending parallel to the longitudinal axis of symmetry (X-X).

6. The sensor (1) according to claim 1, further comprising securing means (54) arranged on the outside of the casing (2) so as to assemble the detector (5) with the casing (2), the securing means (54) having a washer (55) through which washer there passes a part of the detector (5) which is outside the casing (2) and along which part of the groove (52) extends, this washer (55) having central (56) and peripheral (57) tabs, the central tab (56) entering the groove (52) so as to prevent relative rotation between the washer (55) and the detector (5), the peripheral tab (57) entering a complementary housing (58) that is fixed with respect to the casing (2) so as to prevent relative rotation between the washer (55) and the casing (2), the washer (55) being positioned in such a way as to index in terms of rotation the detector (5) with respect to the casing (2).

7. The sensor (1) according to claim 6, in which the securing means (54) comprise a mounting plate (59) having a threaded hole (60) into which is screwed that part of the detector (5) that is outside the casing (2) and along which part of the groove (52) extends, the mounting plate (59) also being secured against an external surface (61) of the casing (2).

8. The sensor according to claim 1, further comprising:
actuating means (6) passing through a second opening (7) formed in the casing (2), the actuating means (6) being arranged in such a way as to control the movement of the moving part (4) situated inside the internal volume (3) from a second external zone (Z2) external to the casing (2);
second sealing means (9) arranged with respect to the casing (2) and with respect to the actuating means (6) in such a way as to oppose the passage of fluid from the second external zone (Z2) external to the casing (2) towards the internal volume (3) of the casing, via the second opening (7) of the casing,
a third opening (10) extending between the internal volume (3) of the casing (2) and a third external zone (Z3) external to the casing and which is distant from the first and second external zones (Z1, Z2) of the casing; and
third sealing means (12) arranged in such a way as to oppose the passage of fluid between the said internal volume (3) of the casing (2) and the third external zone (Z3) via the third opening (10).

9. The sensor according to claim 1, in which the detector (5) comprise electronic components which are situated away from the internal volume (3) and extend into the passage (31) of the casing.

10. The sensor according to claim 9, in which the third sealing means (12) comprise a plug (15) assembled in the third opening (10) of the internal volume (3), the plug (15) being assembled with the casing (2) via a screw thread.

11. The sensor according to claim 10, in which the moving part (4) is able to slide inside the internal volume (3) of the casing and a return spring (17) applies to the moving part (4) an elastic return force returning it towards a first position, the return spring (17) being compressed between the plug (15) and the moving part (4) against each of which it rests.

12. A system comprising a sensor according to claim 8, the system further comprising a hydraulic actuating cylinder (21) comprising a piston (22) and a hydraulic chamber (23) in which the piston (22) slides, the second external zone (Z2) external to the casing (2) and a portion of the actuating means (6) being situated inside the hydraulic chamber (23) of the actuating cylinder (21) so that a movement of the piston (22) in the hydraulic chamber (23) controls the movement of the actuating means (6) and cause the moving part (4) to move inside the internal volume (3) of the casing (2) of the sensor (1).

13. The system according to claim 12, in which the hydraulic actuating cylinder (21) is a hydraulic actuating cylinder that deploys and retracts an aircraft landing gear.

14. The sensor (1) according to claim 7, in which the securing means (54) comprise a nut (62) for clamping the washer (55) against the mounting plate (59), the nut (62) being screwed onto that part of the detector (5) that is outside the casing (2) and along which part of the groove (52) extends.

* * * * *